United States Patent
Senzaki

(10) Patent No.: US 9,792,523 B2
(45) Date of Patent: *Oct. 17, 2017

(54) IMAGE PROCESSING METHOD, IMAGE PROCESSING DEVICE, AND RECORDING MEDIUM

(71) Applicant: NEC Corporation, Minato-ku, Tokyo (JP)

(72) Inventor: Kenta Senzaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/255,474

(22) Filed: Sep. 2, 2016

(65) Prior Publication Data

US 2016/0371562 A1 Dec. 22, 2016

Related U.S. Application Data

(63) Continuation of application No. 14/764,267, filed as application No. PCT/JP2014/053336 on Feb. 13, 2014, now Pat. No. 9,514,383.

(30) Foreign Application Priority Data

Feb. 18, 2013 (JP) ................................. 2013-028876

(51) Int. Cl.
*G06K 9/52* (2006.01)
*H04N 1/409* (2006.01)
(Continued)

(52) U.S. Cl.
CPC ............. *G06K 9/52* (2013.01); *G06K 9/4609* (2013.01); *G06T 5/00* (2013.01); *G06T 5/002* (2013.01);
(Continued)

(58) Field of Classification Search
CPC .......... G06K 9/52; G06K 9/4609; G06T 5/00; G06T 5/20; G06T 5/002;
(Continued)

(56) References Cited

U.S. PATENT DOCUMENTS

| 2002/0031257 A1 | 3/2002 | Kato ................... H04N 1/4092 382/165 |
| 2012/0148163 A1 | 6/2012 | Kido ................... G06K 9/6857 382/199 |
| 2012/0230591 A1 | 9/2012 | Shibata .................. G06T 5/005 382/195 |

FOREIGN PATENT DOCUMENTS

| CN | 102663679 A | 9/2012 |
| JP | 2004-005675 A | 1/2004 |

(Continued)

OTHER PUBLICATIONS

"A Rapid Image Inpainting Algorithm Based on TV Model", Yan-wei Zhao et al., Microelectronics and Computer, vol. 26, issue 6, Jun. 30, 2009, pp. 253-256, 260.

(Continued)

*Primary Examiner* — Ruiping Li

(57) ABSTRACT

An image processing method separates an input image into a skeleton component, and residual component. In the method a local variation amount, which is a variation amount between a target pixel and a pixel adjacent to the target pixel, is calculated; a skeleton component extraction filter weight is calculated based on the local variation amount; an image feature amount of a gradient direction of a pixel value around the target pixel, and an image feature amount of a gradient strength of the pixel value around the target pixel, are calculated; the skeleton component extraction filter weight is corrected based on these image feature amount; a skeleton component extraction filter coefficient is calculated based on the corrected skeleton component (Continued)

extraction filter weight; and the skeleton component is extracted by applying skeleton component extraction filtering to the target pixel using the calculated skeleton component extraction filter coefficient.

8 Claims, 16 Drawing Sheets

(51) Int. Cl.
　　　G06T 5/00　　(2006.01)
　　　G06K 9/46　　(2006.01)
　　　G06T 5/20　　(2006.01)
(52) U.S. Cl.
　　　CPC ............. *G06T 5/20* (2013.01); *H04N 1/4092* (2013.01); *G06T 2207/20012* (2013.01); *G06T 2207/20192* (2013.01)
(58) Field of Classification Search
　　　CPC　G06T 2207/20012; G06T 2207/20192; H04N 1/4092
　　　USPC ......................................................... 382/197
　　　See application file for complete search history.

(56) References Cited

FOREIGN PATENT DOCUMENTS

JP　　　2011-019190 A　　1/2011
WO　　2012/098854 A1　　7/2012

OTHER PUBLICATIONS

Chinese Office Action for CN Application No. 201480009203.5 dated Dec. 2, 2016 with English Translation.
International Search Report for PCT Application No. PCT/JP2014/053336, dated Apr. 1, 2014.
English translation of Written opinion for PCT Application No. PCT/JP2014/053336.
L. Rudin, S. Osher, and E. Fatemi, "Nonlinear total variation based noise removal algorithms," Physic D, vol. 60, pp. 259-268, 1992.
Chan, T.F., Osher, S., Shen, J., "The digital TV filter and nonlinear denoising," Image Processing, IEEE Transactions on, vol. 10, No. 2, pp. 231-241, Feb. 2001.
Yan, Luxin; Fang, Houzhang; Zhong, Sheng, "Blind image deconvolution with spatially adaptive total variation regularization", Optics Letters, vol. 37, issue 14, p. 2778, Jul. 15, 2012.

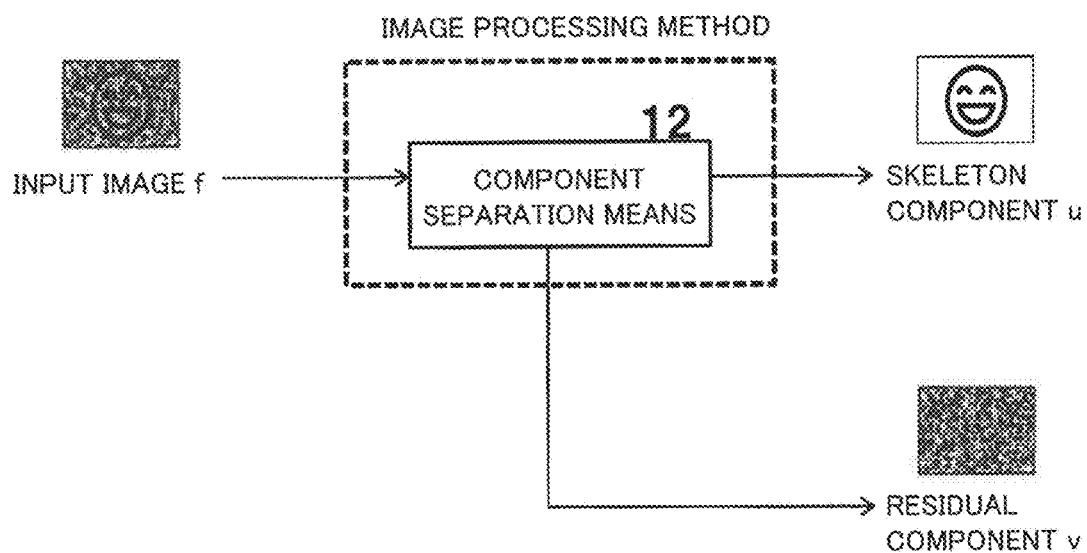
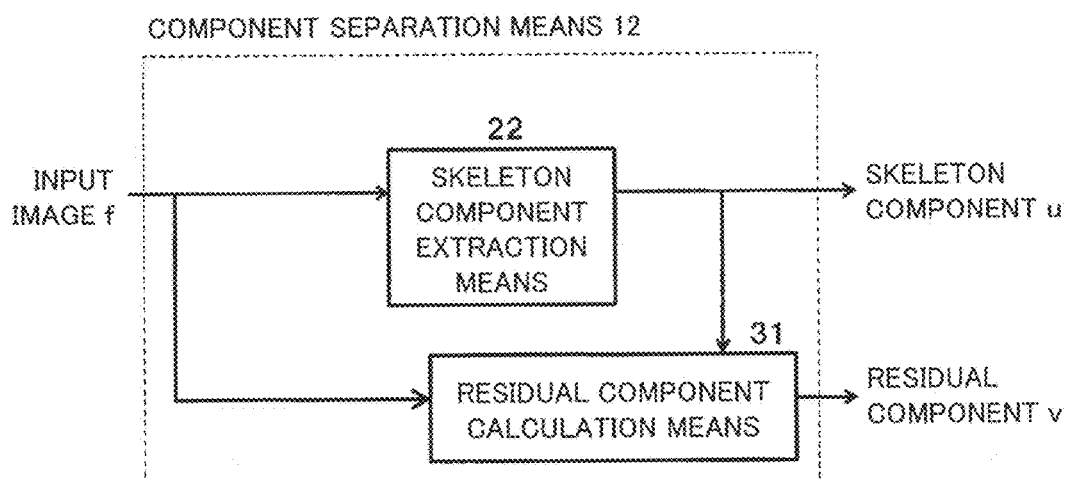

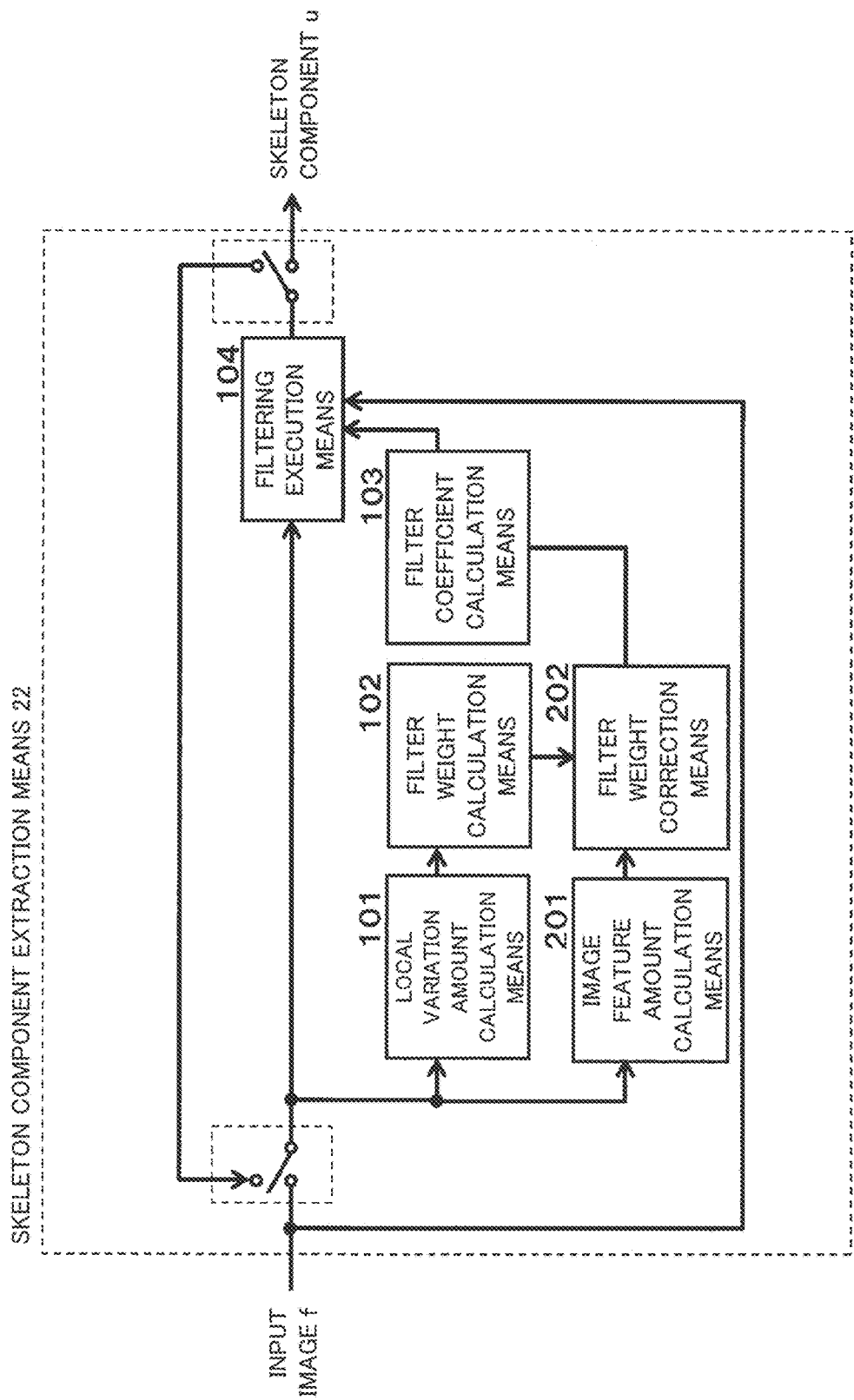

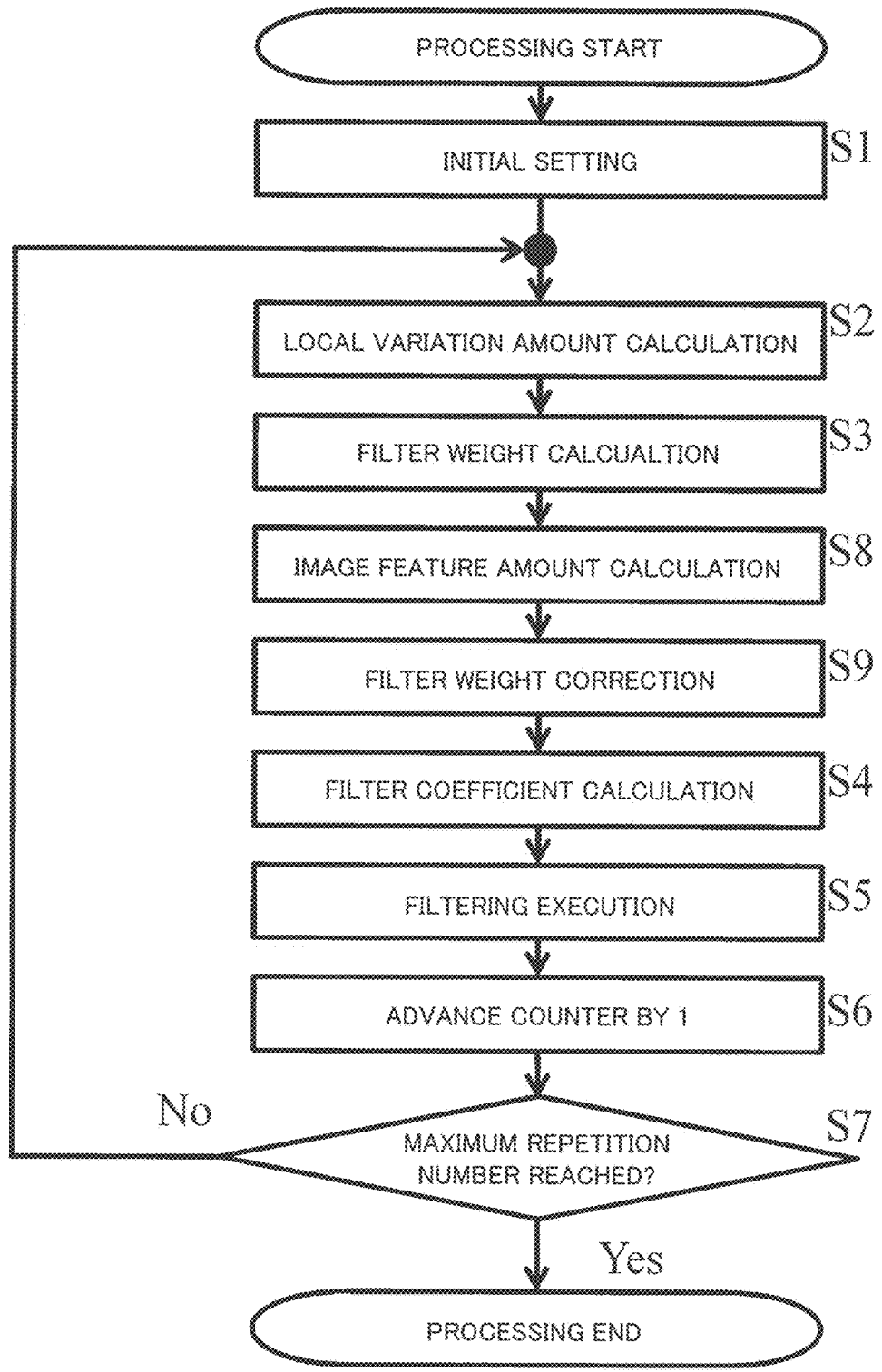

(a) 0°     (b) 45°

(c) 90°    (d) 135°

IMAGE PROCESSING METHOD, IMAGE PROCESSING DEVICE, AND RECORDING MEDIUM

The present application is a continuation application of U.S. patent application Ser. No. 14/764,267 filed on Jul. 29, 2015, which is a National stage entry of International application PCT/JP2014/053336, filed on Feb. 13, 2014, which claims priority from Japanese Patent Application No. 2013-028876, filed on Feb. 18, 2013, the disclosure of all of which are incorporated in their entirely by reference herein.

TECHNICAL FIELD

The present invention relates to an image processing method, an image processing device, and an image processing program.

BACKGROUND ART

Of image processing techniques, a technique for reducing noise included in an image is a necessary technique in order to reproduce a captured image more clearly. As one of the noise included in an image, there is additive white Gaussian noise as illustrated in FIG. 10. An original signal and a signal deteriorated by noise are designated as s and f, respectively. At that time, assuming that an amplitude of a noise $n_G$ follows a Gaussian distribution, the additive white Gaussian noise of FIG. 10 is represented by $f=s+n_G$.

As a technique for reducing noise included an image, for example, a Total Variation norm minimization method (hereinafter, expressed as a TV method) that is a technique disclosed in NPL 1 is widely used.

The TV norm is obtained by adding absolute values of differences between adjacent signals in the whole signal section, and a TV norm of a signal u is defined by the following equation (1):

$$TV(u) = \int_\Omega |\nabla u| dx \quad (1)$$

wherein $\nabla$ represents a partial differential operator.

FIG. 11 to FIG. 13 illustrate examples of the TV norm with respect to a one-dimensional signal. A signal (flat signal) gently changing illustrated in FIG. 11 and a signal including a steep edge illustrated in FIG. 12 have the same TV norm. As illustrated in FIG. 13, when a signal value vibrates, the TV norm has a large value. In other words, the TV norm can be referred to as an index for indicating a smoothness of a signal in consideration of discontinuous components.

The TV method is a method for separating an input image f including noise into a skeleton component u including an edge component and a flat component of the image and a residual component v including a texture component and a noise component. In other words, the relation of the following equation (2) is established.

$$f = u + v \quad (2)$$

The skeleton component u can be determined by minimizing equation (3) in which a normalization term is introduced into the total variation norm TV(u) defined by the equation (1).

$$TV(u) + \frac{\mu}{2} \int_\Omega (u - u^{(0)})^2 dx \quad (3)$$

In equation (3), $u^{(0)}=f$ is satisfied and $\mu$ is a parameter for indicating a fidelity of an original image.

Equation (3) is described below with reference to FIG. 14. A signal illustrated with a solid line in FIG. 14 is designated as an input signal f including noise. TV norms of a signal $u_1$ illustrated with a dashed line in FIG. 14 and a signal $u_2$ illustrated with a dotted line in FIG. 14 each are 10 and are equal to each other. However, as the original signal f and a skeleton component u separate from each other, the second term of equation (3) becomes larger, and therefore in order to minimize above equation (3), a signal illustrated with the dotted line closer to the original signal f is calculated as the skeleton component u.

As described above, the TV method causes to separate an input image including noise into a skeleton component (TV norm: small) including an edge and a flat area of the image and a residual component (TV norm: large) including texture and noise. This skeleton component can be regarded as a noise-eliminated image.

FIG. 15 illustrates a block diagram of one example of an image processing method related to the present invention that separates an input image into a skeleton component and a residual component.

The related image processing method includes a component separation means 11.

An input image f is input to the component separation means 11, and a skeleton component u and a residual component v are output.

FIG. 16 illustrates a block diagram for illustrating the component separation means 11.

The component separation means 11 includes a skeleton component extraction means 21 and a residual component calculation means 31.

The skeleton component extraction means 21 receives an input signal f and minimizes equation (3) to obtain a skeleton component u. The obtained skeleton component u is output to the residual component calculation means 31.

The residual component calculation means 31 receives the input image f and the skeleton component u output from the skeleton component extraction means 21 and determines a residual component v from the relation v=f−u based on the relation of equation (2).

As a method for extracting a skeleton component by minimizing equation (3) in the skeleton component extraction means 21, there is Digital TV Filter (DTVF) that is a technique disclosed in NPL 2.

FIG. 17 illustrates a block diagram for illustrating the skeleton component extraction means 21 that extracts a skeleton component in accordance with DTVF, and operations of respective processing units are described below using the flowchart of FIG. 18.

In the following description, a pixel value in a pixel location $\alpha$ of an image u is expressed as $u_\alpha$. A set of neighbor pixel locations of $\alpha$ is expressed as $N(\alpha)$. FIG. 19 illustrates examples of neighbor pixel locations of a pixel location $\alpha=(i,j)$. Herein, pattern (a) of FIG. 19 is referred to as a four-neighbor matter and $N(\alpha)$ is expressed as $N(\alpha)=\{(i,j-1),(i,j+1),(i-1,j),(i+1,j)\}$. Further, pattern (b) of FIG. 19 is referred to as an eight-neighbor matter and $N(\alpha)$ is expressed as $N(\alpha)=\{(i,j-1),(i,j+1),(i-1,j),(i+1,j),(i-1,j-1),(i-1,j+1),(i+1,j-1),(i+1,j+1)\}$.

The skeleton component extraction means 21 includes a local variation amount calculation means 101, a filter weight calculation means 102, a filter coefficient calculation means 103, and a filtering execution means 104.

Initially, as an initial setting, a counter variable k for storing the number of repetitions is set as k=0. An input image f is designated as an initial skeleton image $u^{(0)}$ (step S1).

The local variation amount calculation means 101 receives an image $u^{(k)}$ and calculates a local variation amount $|\nabla_\alpha u|$ based on the following equation (4) (step S2). The local variation amount $|\nabla_\alpha u|$ obtained by the calculation is output to the filter weight calculation means 102.

$$|\nabla_\alpha u| = |\nabla_\alpha u|_\epsilon = \sqrt{\Sigma_{\beta \in N(\alpha)}(u_\beta^{(k)} - u_\alpha^{(k)})^2 + \epsilon^2} \quad (4)$$

$\epsilon$ in equation (4) is a parameter for preventing division by 0 in the following processing and may be a value of about $10^{-4}$.

The filter weight calculation means 102 receives the local variation amount $|\nabla_\alpha u|$ from the local variation amount calculation means 101 and calculates a filter weight $w_{\alpha\beta}(u)$ represented by the following equation (5) (step S3). The filter weight $w_{\alpha\beta}(u)$ obtained by the calculation is output to the filter coefficient calculation means 103.

$$w_{\alpha\beta}(u) = \frac{1}{|\nabla_\alpha u|} + \frac{1}{|\nabla_\beta u|} \quad (5)$$

The filter coefficient calculation means 103 receives the filter weight $W_{\alpha\beta}(u)$ from the filter weight calculation means 102 and calculates filter coefficients $h_{\alpha\alpha}$ and $h_{\alpha\beta}$ based on the following equations (6) and (7), respectively (step S4). The filter coefficients $h_{\alpha\alpha}$ and $h_{\alpha\beta}$ obtained by the calculation are output to the filtering execution means 103.

$$h_{\alpha\alpha} = \frac{\mu}{\mu + \Sigma_{\gamma \in N(\alpha)} w_{\alpha\gamma}(u^{(k)})} \quad (6)$$

$$h_{\alpha\beta} = \frac{w_{\alpha\beta}(u^{(k)})}{\mu + \Sigma_{\gamma \in N(\alpha)} w_{\alpha\gamma}(u^{(k)})} \quad (7)$$

The filtering execution means 104 receives the initial image $u^{(0)}$ and the image $u^{(k)}$ that is a filtering target, as well as the filter coefficients $h_{\alpha\alpha}$ and $h_{\alpha\beta}$ from the filter coefficient calculation means 103, calculates an image $u^{(k+1)}$ after filtering of k+1 times based on the following equation (8) (step S5), and increases the repetition number counter k by 1 (step S6).

$$u_\alpha^{(k+1)} = \Sigma_{\beta \in N(\alpha)} h_{\alpha\beta} u_\beta^{(k)} + h_{\alpha\alpha} u_\alpha^{(0)} \quad (8)$$

Then, k and a maximum repetition number $k_{max}$ are compared, and when k is less than the maximum repetition number $k_{max}$, for the next repetition calculation, an image after filtering is output to the local variation amount calculation means 101 and the filtering execution means 104 and the processing is continued. When k has reached the maximum repetition number $k_{max}$, the image is output as a skeleton component u (step S7).

As is clear from equations (5), (6), and (7), when a local variation amount is sufficiently large compared to a noise component, $h_{\alpha\alpha} \approx 1$ is satisfied, and therefore a blur of an edge is preventable. In contrast, when the local variation amount is small, DTVF regards this area as being flat and $h_{\alpha\alpha} \approx 0$ is satisfied, and therefore DTVF behaves like a common lowpass filter. Regarding $\mu$, using an estimated noise standard deviation $\sigma$, the relation: $\mu = 1/\sigma^2$ may be satisfied.

FIG. 20 illustrates a block diagram of a related image processing device 1000 that separates an input image into a skeleton component and a residual component.

The image processing device 1000 includes a local variation amount calculation unit 1001, a filter weight calculation unit 1002, a filter coefficient calculation unit 1003, a filtering execution unit 1004, a residual component calculation unit 1005, a control unit 1006, a switch 1007, a switch 1008, and a memory 1009.

An input image f is input from an input buffer to the switch 1007 and the memory 1009.

The control unit 1006 is configured using a microcomputer or the like and executes a stored program to control the respective units. The control unit 1006 includes a counter variable k that stores the number of times of filtering. When an image is input from the input buffer, the control unit 1006 resets the counter k to be k=0, switches the switch 1007 to output the input image f to the local variation amount calculation unit 1001 and the filtering execution unit 1004 as an initial skeleton image $u^{(0)}$, and switches the switch 1007. Then, the control unit 1006 outputs an image received not from the input buffer but from the switch 1008 to the local variation amount calculation unit 1001 and the filtering execution unit 1004.

The control unit 1006 monitors the filtering execution unit 1004 and increases the filtering number counter k by 1 when filtering is completed. Then, the control unit 1006 compares k and a maximum repetition number $k_{max}$, switches the switch 1008 so as to output an image to the switch 1007 when k is less than the maximum repetition number $k_{max}$, and switches the switch 1008 so as to output an image to an output buffer and the residual component calculation unit 1005 as a skeleton component u when k has reached the maximum repetition number $k_{max}$.

The switch 1007 and the switch 1008 are switched in accordance with control of the control unit 1006.

The memory 1009 stores the input image f.

The local variation amount calculation unit 1001 receives an image $u^{(k)}$ from the switch 1007 and calculates a local variation amount $|\nabla_\alpha u|$ based on the above equation (4). The local variation amount $|\nabla_\alpha u|$ obtained by the calculation is output to the filter weight calculation unit 1002.

The filter weight calculation unit 1002 receives the local variation amount $|\nabla_\alpha u|$ from the local variation amount calculation unit 1001 and calculates a filter weight $w_{\alpha\beta}(u)$ represented by the above equation (5).

The filter weight $w_{\alpha\beta}(u)$ obtained by the calculation is output to the filter coefficient calculation unit 1003.

The filter coefficient calculation unit 1003 receives the filter weight $w_{\alpha\beta}(u)$ from the filter coefficient calculation unit 1001 and calculates filter coefficients $h_{\alpha\alpha}$ and $h_{\alpha\beta}$ based on the above equations (6) and (7), respectively. The filter coefficients $h_{\alpha\alpha}$ and $h_{\alpha\beta}$ obtained by the calculation are output to the filtering execution unit 1004.

The filtering execution unit 1004 reads the input image $u^{(0)}$ from the memory 1009, receives the image $u^{(k)}$ as a filtering target from the switch 1007 and the filter coefficients $h_{\alpha\alpha}$ and $h_{\alpha\beta}$ from the filter coefficient calculation unit 1003, and calculates an image $u^{(k+1)}$ after filtering of k+1 times based on the above equation (8). The image $u^{(k+1)}$ after filtering of k+1 times obtained by the calculation is output to the switch 1008.

The residual component calculation unit 1005 receives the input image $u^{(0)}$ from the memory 1009 and the skeleton component u from the switch 1008, and obtains a residual component v from the relation of equation (2). The obtained residual component v is output to the output buffer.

CITATION LIST

Non Patent Literature

NPL 1: L. Rudin, S. Osher, and E. Fatemi, "Nonlinear total variation based noise removal algorithms," Physic D, vol. 60, pp. 259-268, 1992.
NPL 2: Chan, T. F., Osher, S., Shen, J., "The digital TV filter and nonlinear denoising," Image Processing, IEEE Transactions on, vol. 10, no. 2, pp. 231-241, February 2001.
NPL 3: Yan, Luxin; Fang, Houzhang; Zhong, Sheng, "Blind image deconvolution with spatially adaptive total variation regularization", Optics Letters, vol. 37, issue 14, p. 2778

SUMMARY OF INVENTION

Technical Problem

The TV method determines a filter coefficient on the basis of a local variation amount, but it is difficult to discriminate, based on the local variation amount, a difference between a local variation amount due to an edge and a local variation amount due to noise vibration. This causes $h_{\alpha\alpha}\sim 1$ not to be satisfied with respect to an edge in which a variation amount of a pixel value between adjacent pixels is relatively small, and therefore a problem of occurrence of a slight blur is produced. Further, the TV method is repetition processing, and therefore with a progress of repetition, such a blur becomes more noticeable.

In other words, the TV method has a problem in improvement of edge storage performance for a state where a variation amount of a pixel value is relatively small.

As a method for edge storage in the TV method, there is a method in which a fidelity parameter $\mu$ is adapted to a spatial feature of an image as disclosed in NPL 3. This method prevents blur by increasing the fidelity parameter $\mu$ so that $h_{\alpha\alpha}\approx 1$ is satisfied when an edge is present. However, this case is equivalent to a case in which filtering is not applied to a pixel on the edge, and therefore a problem in which noise around the edge remains is existed.

Therefore, the present invention has been made in view of the above problems, and an object thereof is to provide an image processing method, an image processing device, and an image processing program, which are capable of effectively eliminating noise with preserving an edge in which a variation amount of a pixel value is relatively small.

Solution to Problem

An image processing method according to one aspect of the present invention, the method that separates an input image into a skeleton component including an edge component and a flat component and into a residual component expressed by a difference between the input image and the skeleton component, the method includes: calculating a local variation amount that is a variation amount between the target pixel and a pixel adjacent to the target pixel; calculating a skeleton component extraction filter weight based on the local variation amount; calculating an image feature amount of a gradient direction of a pixel value in a surrounding of the target pixel and an image feature amount of a gradient strength of the pixel value in the surrounding of the target pixel; correcting the skeleton component extraction filter weight based on the image feature amount in the gradient direction and the image feature amount of the gradient strength; calculating a skeleton component extraction filter coefficient based on the corrected skeleton component extraction filter weight; and extracting the skeleton component by applying skeleton component extraction filtering to the target pixel using the skeleton component extraction filter coefficient calculated.

An image processing device according to one aspect of the present invention, that separates an input image into a skeleton component including an edge component and a flat component and into a residual component expressed by a difference between the input image and the skeleton component, the device includes: a local variation amount calculation unit configured to calculate a local variation amount that is a variation amount between a target pixel and a pixel adjacent to the target pixel; a skeleton component extraction filter weight calculation unit configured to calculate a skeleton component extraction filter weight based on the local variation amount; an image feature amount calculation unit configured to calculate an image feature amount of a gradient direction of a pixel value in a surrounding of the target pixel and an image feature amount of a gradient strength of the pixel value in the surrounding of the target pixel; a skeleton component extraction filter weight correction unit configured to correct the skeleton component extraction filter weight based on the image feature amount in the gradient direction and the image feature amount of the gradient strength; a skeleton component extraction filter coefficient calculation unit configured to calculate a skeleton component extraction filter coefficient based on the corrected skeleton component extraction filter weight; and a skeleton component extraction filtering execution unit configured to extract the skeleton component by applying skeleton component extraction filtering to the target pixel using the skeleton component extraction filter coefficient calculated.

A program of image processing according to one aspect of the present invention, that the image processing separates an input image into a skeleton component including an edge component and a flat component and into a residual component expressed by a difference between the input image and the skeleton component, the program causes a computer to execute: local variation amount calculation processing for calculating a local variation amount that is a variation amount between the target pixel and a pixel adjacent to the target pixel; skeleton component extraction filter weight calculation processing for calculating a skeleton component extraction filter weight based on the local variation amount; image feature amount calculation processing for calculating an image feature amount of a gradient direction of a pixel value in a surrounding of the target pixel and an image feature amount of a gradient strength of the pixel value in the surrounding of the target pixel; skeleton component extraction filter weight correction processing for correcting the skeleton component extraction filter weight based on the image feature amount in the gradient direction and the image feature amount of the gradient strength; skeleton component extraction filter coefficient calculation processing for calculating a skeleton component extraction filter coefficient based on the corrected skeleton component extraction filter weight; and skeleton component extraction filtering execution processing for extracting the skeleton component by applying skeleton component extraction filtering to the target pixel using the calculated skeleton component extraction filter coefficient.

Advantageous Effects of Invention

According to the present invention, noise can be effectively eliminated with preserving an edge in which a variation amount of a pixel value is relatively small.

BRIEF DESCRIPTION OF DRAWINGS

FIG. 1 is a block diagram for an image processing method of an exemplary embodiment of the present invention.

FIG. 2 is a block diagram for illustrating a component separation unit 12.

FIG. 3 is a block diagram for illustrating a skeleton component extraction unit 22.

FIG. 4 is a flowchart for illustrating operations of respective processing units of the skeleton component extraction unit 22.

DESCRIPTION OF EMBODIMENTS

Figure 5:
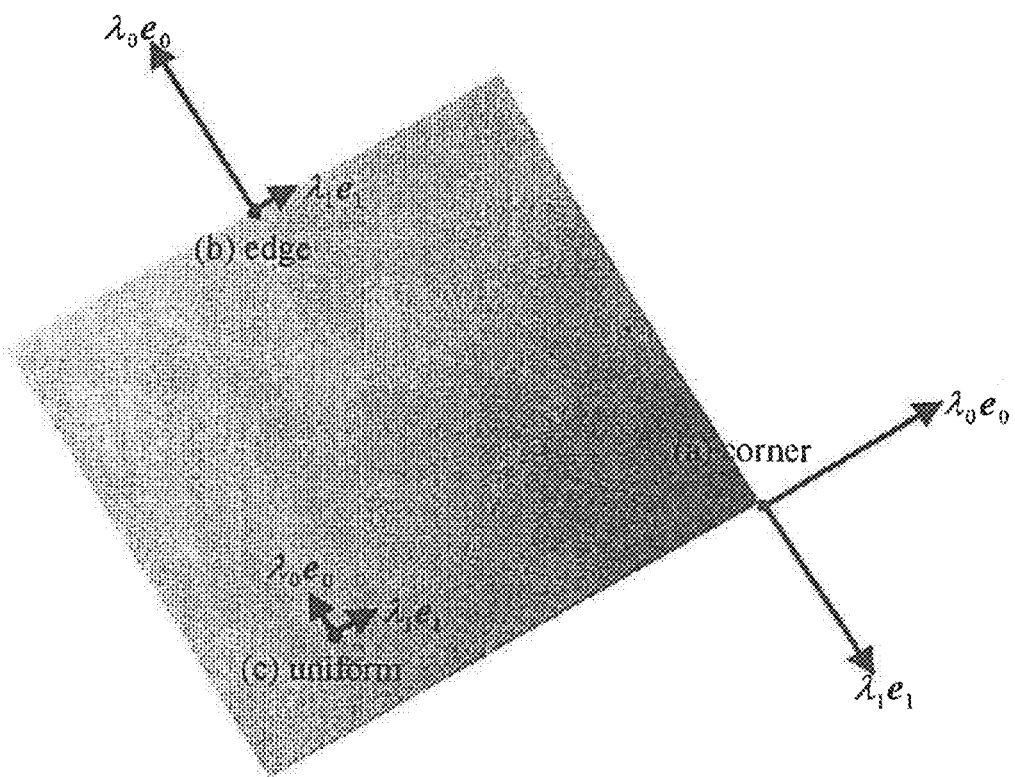
FIG. 5 is a conceptual diagram of a relation between each area of an image and an eigenpair of a gradient covariance matrix.

An exemplary embodiment of the present invention will now be described.

FIG. 1 illustrates a block diagram of an image processing method of the exemplary embodiment of the present invention.

An image processing method of a first exemplary embodiment of the present invention includes a component separation means 12.

An input image f is input to the component separation means 12, and a skeleton component u and a residual component v are output.

FIG. 2 illustrates a block diagram for illustrating the component separation means 12 of the image processing method of the first exemplary embodiment of the present invention.

The component separation means 12 includes a skeleton component extraction means 22 and a residual component calculation means 31.

The skeleton component extraction means 22 receives the input image f and obtains a skeleton component u using a method based on the flowchart of FIG. 4 to be described later. The obtained skeleton component u is output to the residual component calculation means 31.

The residual component calculation means 31 receives the input image f and the skeleton component u output from the skeleton component extraction means 21 and determines a residual component v from the relation v=f−u based on the relation of equation (2).

FIG. 3 is a block diagram for illustrating the skeleton component extraction means 22 of the image processing method of the exemplary embodiment of the present invention.

The skeleton component extraction means 22 includes the local variation amount calculation means 101, the filter weight calculation means 102, the filter coefficient calculation means 103, and the filtering execution means 104 in the same manner as the skeleton component extraction means 21, and in addition thereto, includes an image feature amount calculation unit 201 and a filter weight correction unit 202.

Next, operations of the respective processing units of the skeleton component extraction means 22 will be described below with reference to the flowchart of FIG. 4.

Initially, in the same manner as the skeleton component extraction means 21, as an initial setting, a counter variable k for storing the number of repetitions is set as k=0. Further, an input image f is set as an initial skeleton image $u^{(0)}$ (step S1).

The local variation amount calculation means 101 calculates a local variation amount $|\nabla_\alpha u|$ based on equation (4) by the same operation as the conventional skeleton component extraction means 21 (step S2) and outputs the calculated amount to the filter weight calculation means 102.

The filter weight calculation means 102 calculates a filter weight $|w_{\alpha\beta}(u)|$ represented by equation (5) by the same operation as the skeleton component extraction means 21 (step S3). The filter weight calculation means 102 outputs the filter weight $|w_{\alpha\beta}(u)|$ obtained by the calculation to the filter weight correction means 202, differently from the skeleton component extraction means 21.

The image feature amount calculation means 201 receives an image $u^{(k)}$ after filtering of k times and calculates, as an image feature amount, each eigenpair (eigenvalues and eigenvectors) of a gradient covariance matrix M represented by the following equation (9) (step S8). The eigenvalue corresponds to a gradient strength of a pixel value in a surrounding of a target pixel, and the eigenvector corresponds to a gradient direction of the pixel value in the surrounding of the target pixel. Each eigenpair obtained is output to the filter weight correction means 202 as the image feature amount.

$$M = \begin{pmatrix} G_\sigma\left(\left(\frac{\partial I}{\partial x}\right)^2\right) & G_\sigma\left(\frac{\partial I}{\partial x}\frac{\partial I}{\partial y}\right) \\ G_\sigma\left(\frac{\partial I}{\partial x}\frac{\partial I}{\partial y}\right) & G_\sigma\left(\left(\frac{\partial I}{\partial y}\right)^2\right) \end{pmatrix} \quad (9)$$

In equation (9), ∂I/∂x represents a gradient of an image in a horizontal direction, ∂I/∂y represents a gradient in a vertical direction, and $G_\sigma(\cdot)$ represents smoothing of a standard deviation σ by a Gaussian function. Eigenvalues of this matrix M are designated as $\lambda_0$ and $\lambda_1$ ($\lambda_0 \geq \lambda_1$), and eigenvectors corresponding to the respective eigenvalues are designated as $e_0$ and $e_1$. It is known that eigenvalues of a matrix M have the following properties.

1. When $\lambda_0$ and $\lambda_1$ each have a relatively large value, a target pixel is on a corner.
2. When $\lambda_0$ has a relatively large value and $\lambda_1 \approx 0$, a target pixel is included in an edge area.
3. When $\lambda_0 \approx 0$ and $\lambda_1 \approx 0$, a target pixel is included on a flat area.

FIG. 5 illustrates a conceptual diagram of a relation between each area of an image and an eigenpair of a gradient covariance matrix M.

According to the properties of eigenvalues of the gradient covariance matrix M, when both of the eigenvalues are large as eigenvector (a) in FIG. 5, a target pixel is on a corner, and therefore in order to maintain a sharpness of an image, it is not desirable to execute lowpass filtering for the target pixel in any direction. In other words, assuming that a filter coefficient of the filtering execution means 104 is a filter coefficient used upon weighting-addition of an initial image and an image obtained by applying predetermined processing to the initial image, it is better for the filter weight correction means 202 to correct a weight of the filtering execution means 104 so that a filter coefficient for the initial image increases with an increase in gradient strength (so that the initial image becomes dominant).

When one of the eigenvalues are large and the other is small as eigenvector (b) in FIG. 5, a target pixel is located on an edge, and therefore no lowpass filtering is executed for a direction of an eigenvector corresponding to the large eigenvalue (i.e., a direction crossing the edge), while lowpass filtering is executed for a direction of an eigenvector corresponding to the small eigenvalue (i.e., a direction along the edge). In other words, assuming that a filter coefficient of the filtering execution means 104 is a filter coefficient used upon weighting-addition of an initial image and an image obtained by applying predetermined processing to the initial image, it is better for the filter weight correction means 202 to correct a weight of the filtering execution means 104 so that with an increase in gradient strength in a gradient direction, a filter coefficient for the initial image increases in the direction, or alternatively with a decrease in gradient strength in a gradient direction, a filter coefficient for the initial image decreases in the direction.

When both of the eigenvalues are small as eigenvector (c) in FIG. 5, a target pixel is not located in a characteristic area in an image, and therefore lowpass filtering may be executed for any of the directions. In other words, assuming that a filter coefficient of the filtering execution means 104 is a filter coefficient used upon weighting-addition of an initial image and an image obtained by applying predetermined processing to the initial image, it is better for the filter weight correction means 202 to correct a weight of the filtering execution means 104 so that a filter coefficient for the initial image decreases with a decrease in gradient strength.

The filter weight correction means 202 receives the local variation amount $|\nabla_\alpha u|$ from the local variation amount calculation means 101 and eigenpairs $\lambda_0$, $\lambda_1$, $e_0$, $e_1$ of the matrix M of equation (9) as an image feature amount from the image feature amount calculation means 101, and corrects the filter weight $w_{\alpha\beta}(u)$ of equation (5) as $w'_{\alpha\beta}(u)$ of the following equation (10) based on the above-described properties of eigenvalues of a gradient covariance matrix (step S9). The filter weight $w'_{\alpha\beta}(u)$ obtained by the correction is output to the filter coefficient calculation means 103.

$$w'_{\alpha\beta}(u) = \frac{1}{(|\lambda_0 e_0^T d_{\beta-\alpha}| + |\lambda_1 e_1^T d_{\beta-\alpha}| + \varepsilon)} w_{\alpha\beta}(u) \quad (10)$$

ε is used for preventing division by 0. $d_{\beta-\alpha}$ indicates a pixel location β direction vector when viewed from a target pixel location α and is represented by the following equation (11).

$$d_{\beta-\alpha} = \frac{\beta - \alpha}{\|\beta - \alpha\|} \quad (11)$$

Figure 6:
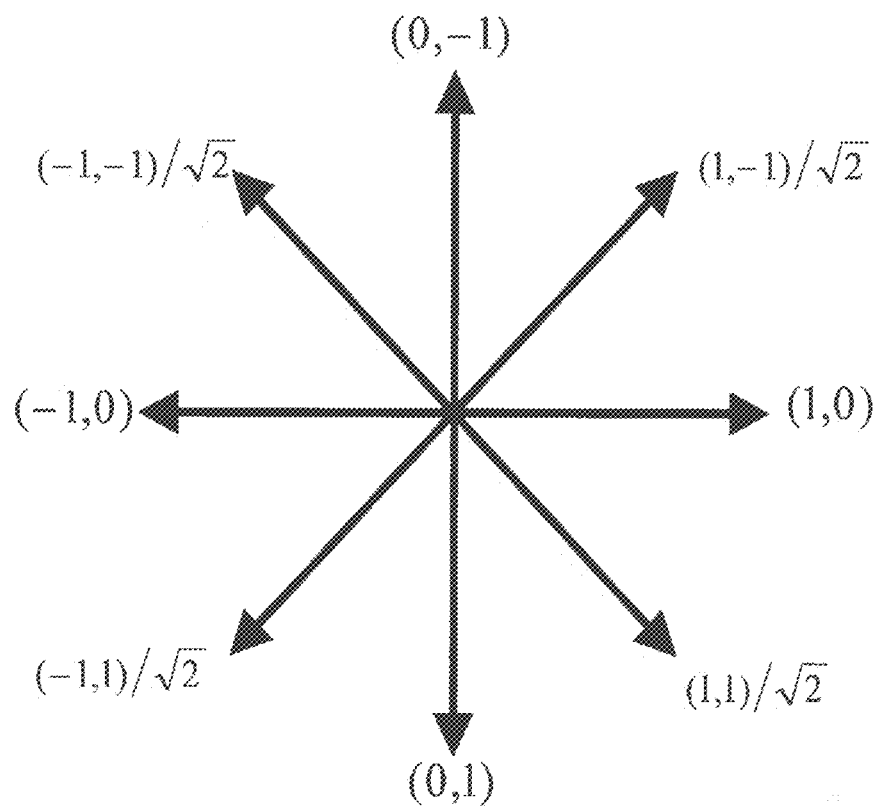
FIG. 6 is a diagram for illustrating direction vectors of eight directions.
Figure 19:
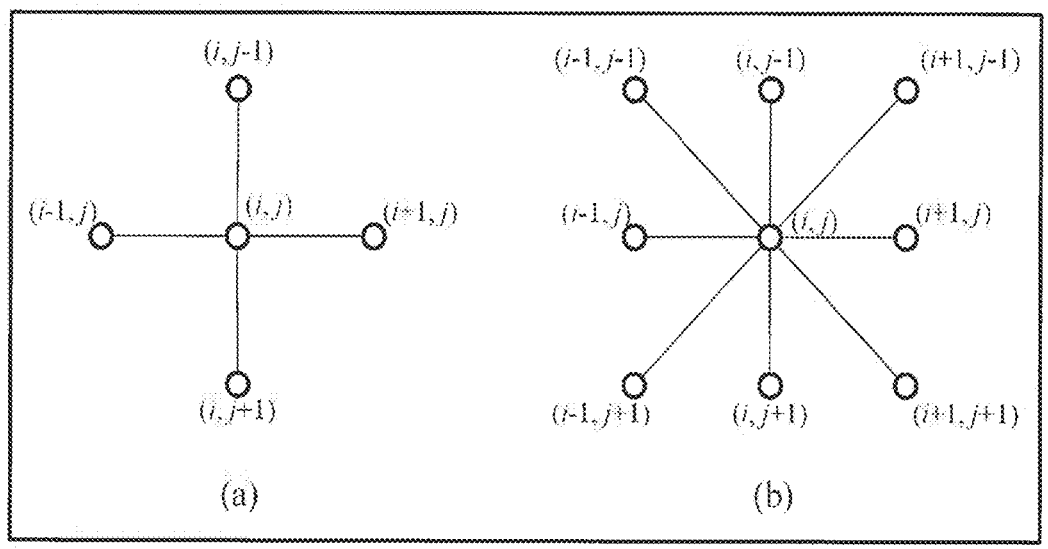
FIG. 19 depicts diagrams for illustrating examples of neighbor pixel locations of a pixel location α.
Figure 20:
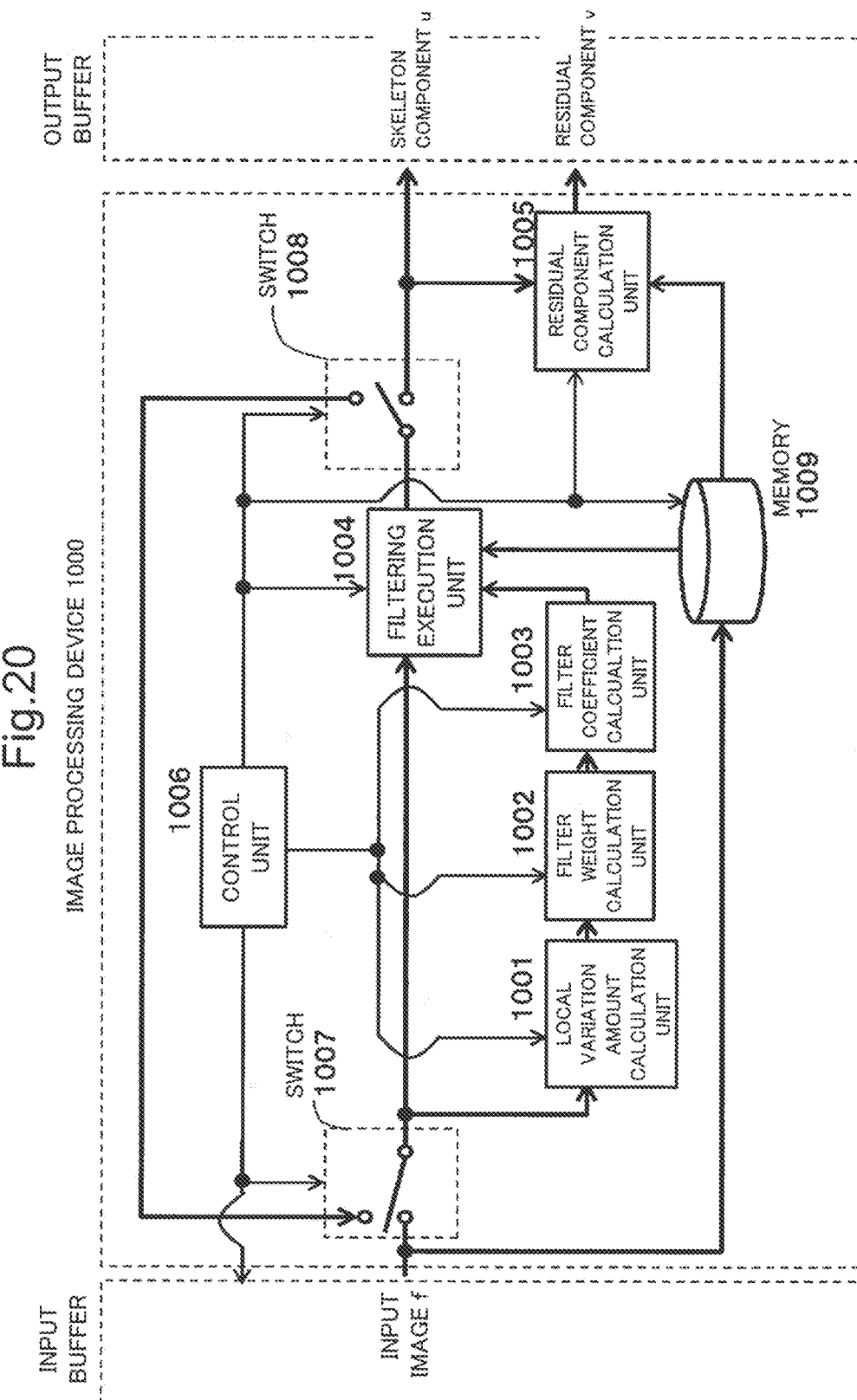
FIG. 20 is a block diagram of a related image processing device 1000.

When, for example, eight-neighbor pixels are considered as pattern (b) in FIG. 19, vectors of eight directions are defined as in FIG. 6. Oblique directions (45 degrees, 135 degrees, 225 degrees, and 315 degrees) are normalized so that each norm is set as 1.

Figure 7:
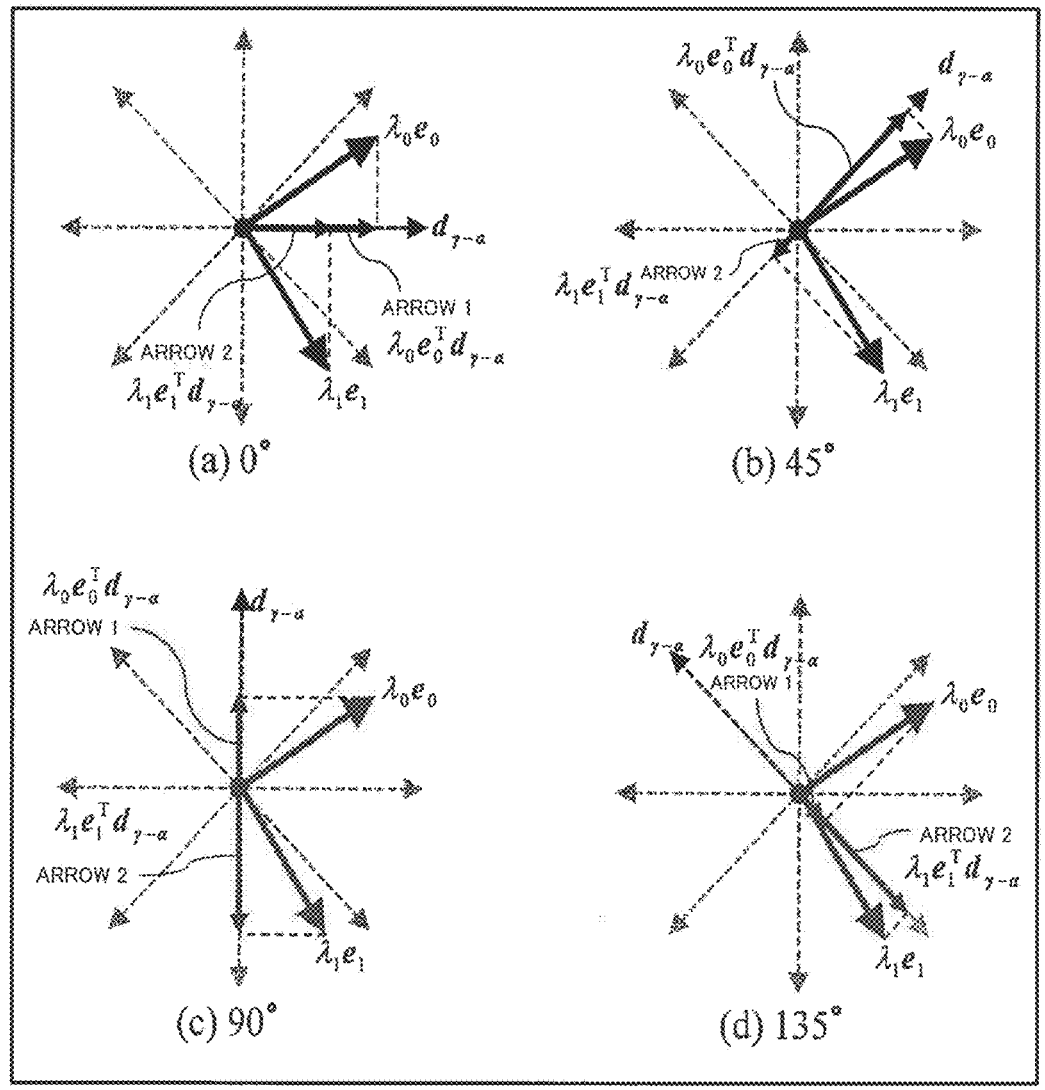
FIG. 7 is a conceptual diagram of correction amount calculation of a filter coefficient in a corner.

FIG. 7 is a conceptual diagram of correction amount calculation of a filter coefficient in a corner. An arrow 1 indicates an arrow obtained by projecting $\lambda_0 e_0$ onto one directional vector and an arrow 2 indicates an arrow obtained by projecting $\lambda_1 e_1$ onto one directional vector. In the corner, $\lambda_0$ and $\lambda_1$ each have a large value, and therefore in every direction of the eight neighbors, a value of $|\lambda_0 e_0^T d_{\beta-\alpha}| + |\lambda_1 e_1^T d_{\beta-\alpha}|$ increases. In other words, the filter coefficient value represented by equation (10) decreases. Therefore, in the corner, the second term $(h_{\alpha\alpha}(u) u_\alpha^{(0)}$ of equation (8) becomes dominant, and therefore no blur is generated.

Figure 8:
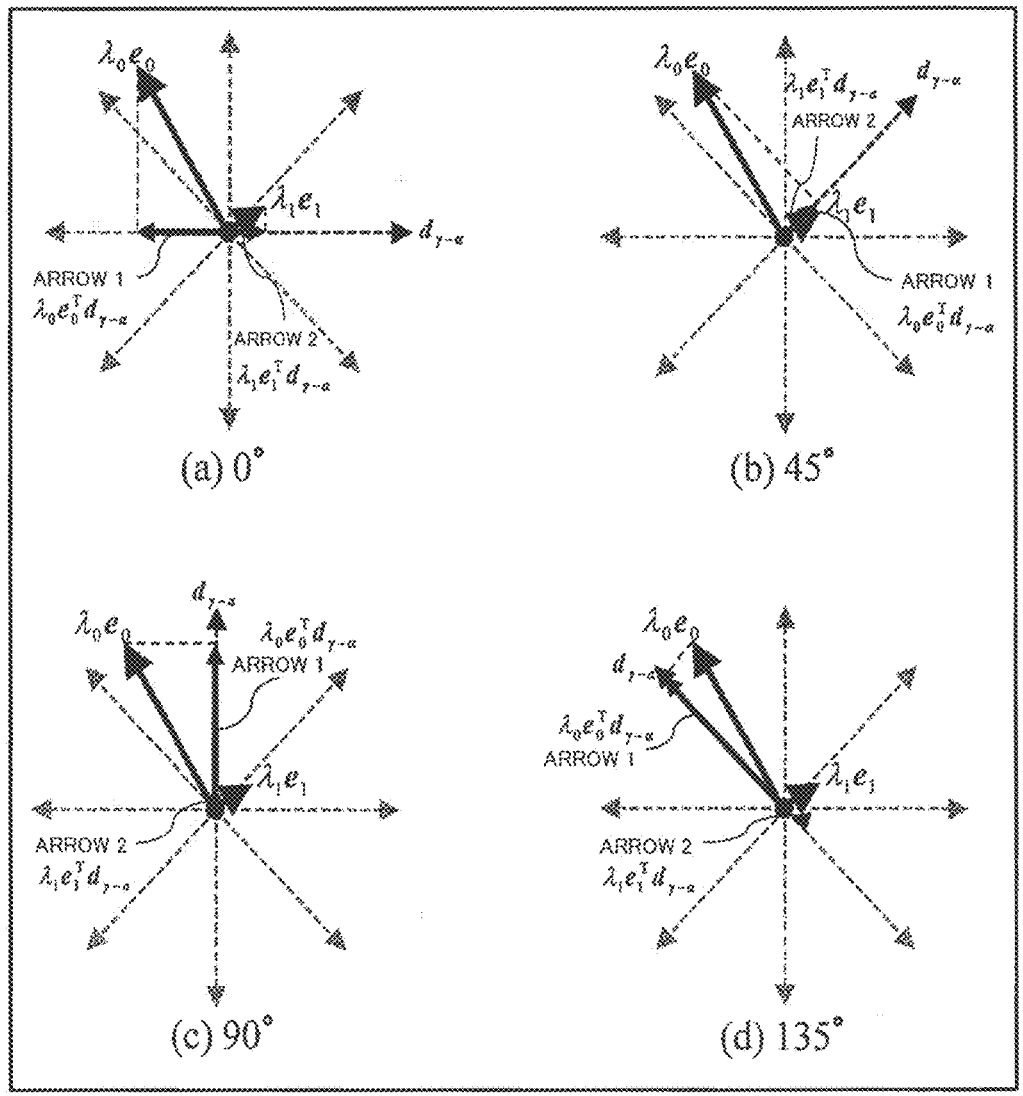
FIG. 8 is a conceptual diagram of correction amount calculation of a filter coefficient in an edge.

FIG. 8 is a conceptual diagram of correction amount calculation for a filter coefficient in an edge. In a corner, $\lambda_0$ has a large value and $\lambda_1$ has a relatively small value. Since $\lambda_0$ has the large value, for directions other than a direction to which $e_0$ is orthogonal (i.e., a direction of $e_1$), $|\lambda_0 e_0^T d_{\beta-\alpha}|$ increases. In other words, the filter coefficient value represented by equation (10) decreases. For a direction (a 45° direction of FIG. 8) close to the direction to which $e_0$ is orthogonal (i.e., the direction of $e_1$), $|\lambda_0 e_0^T d_{\beta-\alpha}| \approx 0$ is satisfied, and since $\lambda_1$ also has a relatively small value, $|\lambda_1 e_1^T d_{\beta-\alpha}| \approx 0$ is satisfied. Therefore, for the direction close to $e_1$, the filter coefficient value represented by equation (10) increases, and then lowpass filtering is executed.

Lastly, for a flat area, $\lambda_0 \approx 0$ and $\lambda_1 \approx 0$. Therefore, for any direction, $|\lambda_0 e_0^T d_{\beta-\alpha}| + |\lambda_1 e_1^T d_{\beta-\alpha}| \approx 0$ is satisfied, and therefore lowpass filtering is executed for all the directions.

The filter coefficient calculation means 103 receives the filter weight $w'_{\alpha\beta}(u)$ which is the corrected filter weight $w_{\alpha\beta}$ from the weight correction means 202 and calculates filter coefficients $h_{\alpha\alpha}$ and $h_{\alpha\beta}$ based on equations (6) and (7), respectively, using the filter weight $w'_{\alpha\beta}(u)$ instead of the filter weight $w_{\alpha\beta}$ (step S4). The filter coefficients $h_{\alpha\alpha}$ and $h_{\alpha\beta}$ obtained by the calculation are output to the filtering execution means 104.

The filtering execution means 104 receives the input image) $u^{(0)}$ and the image $u^{(k)}$ that is a filtering target, as well as the filter coefficients $h_{\alpha\alpha}$ and $h_{\alpha\beta}$ from the filter coefficient calculation means 103, calculates an image $u^{(k+1)}$ after filtering of k+1 times based on equation (8) (step S5), and increases the counter k by 1 (step S6).

Then, k and the maximum repetition number $k_{max}$ are compared, and when k is less than the maximum repetition number $k_{max}$, for the next repetition calculation, an image after filtering is output to the local variation amount calculation means 101 and the filtering execution means 104, and the processing is continued. When k has reached the maximum repetition number $k_{max}$, the image is output as a skeleton component u (step S7).

Note that, in the flowchart of FIG. 4, the image feature amount calculation of step S8 follows the local variation amount calculation of step S2 and the filter weight calculation of step S3 but may be executed anywhere before the initial setting of step S1 and the filter weight correction of step S9.

Equation (10) calculates the filter weight $w'_{\alpha\beta}(u)$ based on a reciprocal of a value obtained by projecting an eigenpair of the gradient covariance matrix M onto an adjacent pixel direction, but may be formed as a function as in the following equation (12) and also may be expanded as in equation (13), as one example of the same technical idea.

$$w'_{\alpha\beta}(u) = F(|\lambda_0 e_0^T d_{\beta-\alpha}| + |\lambda_1 e_1^T d_{\beta-\alpha}|) \times w_{\alpha\beta}(u) \quad (12)$$

$$F(x) = \begin{cases} \tau_{Min}, & \dfrac{1}{\rho x + \varepsilon} < \tau_{Min} \\ \tau_{Max}, & \dfrac{1}{\rho x + \varepsilon} > \tau_{Max} \\ \dfrac{1}{\rho x + \varepsilon}, & \text{otherwise} \end{cases} \quad (13)$$

In the example of equation (13), to prevent a filter coefficient value from being excessively corrected, an upper limit value and a lower limit value of correction are set. Further, strength of the correction is adjusted via multiplication of a parameter ρ.

In this manner, in the exemplary embodiment of the present invention, on the basis of two image feature amounts of a gradient direction and a gradient strength of a pixel value in a surrounding of a target pixel, lowpass filtering is executed in an optimum filtering direction. Use of the image processing method described in the exemplary embodiment of the present invention makes it possible to effectively eliminate noise with preserving an edge in which a variation amount of a pixel value is relatively small.

Figure 9:
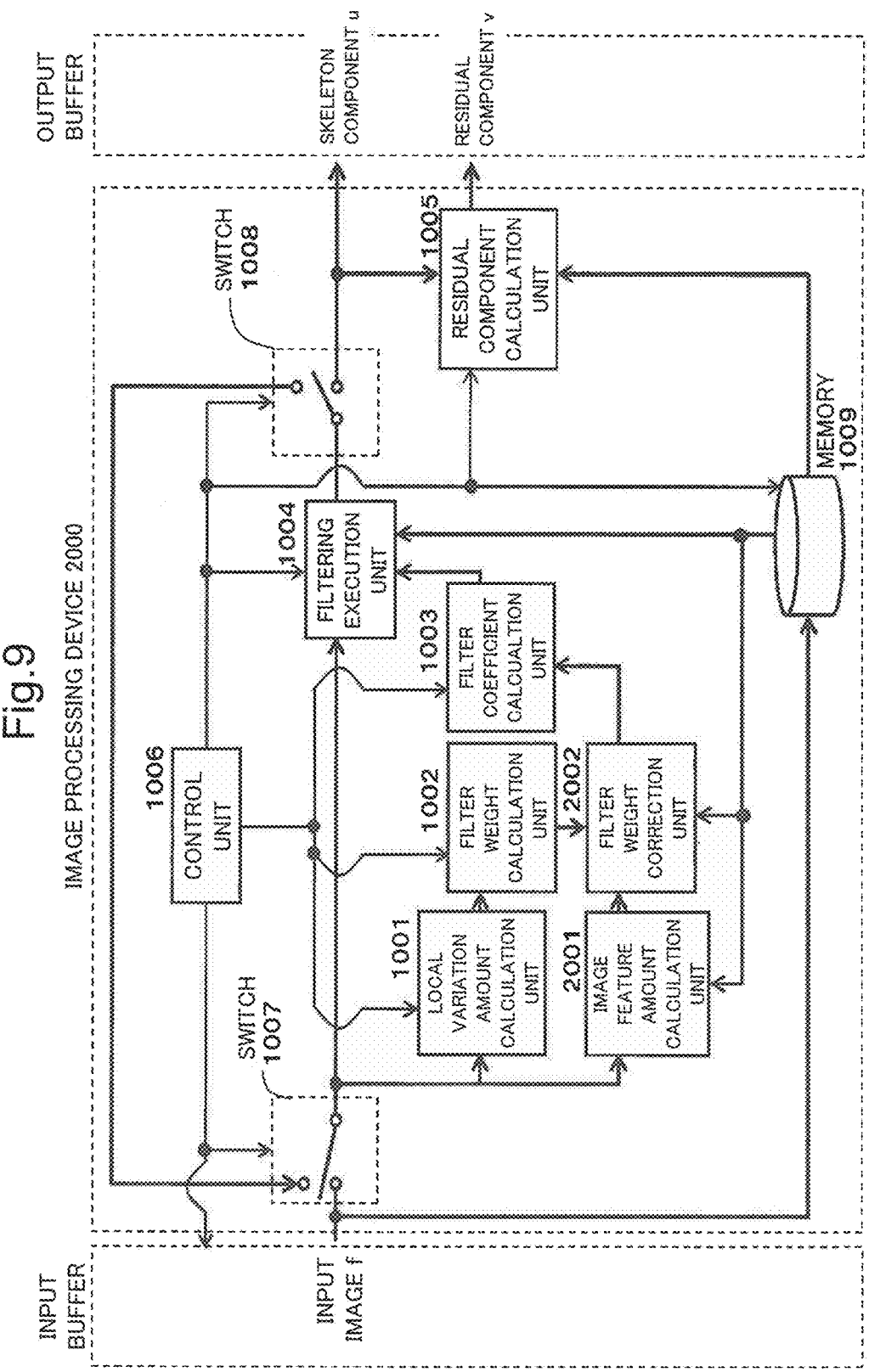
FIG. 9 is a block diagram of an image processing device 2000 of a first exemplary embodiment of the present invention.
Figure 10:
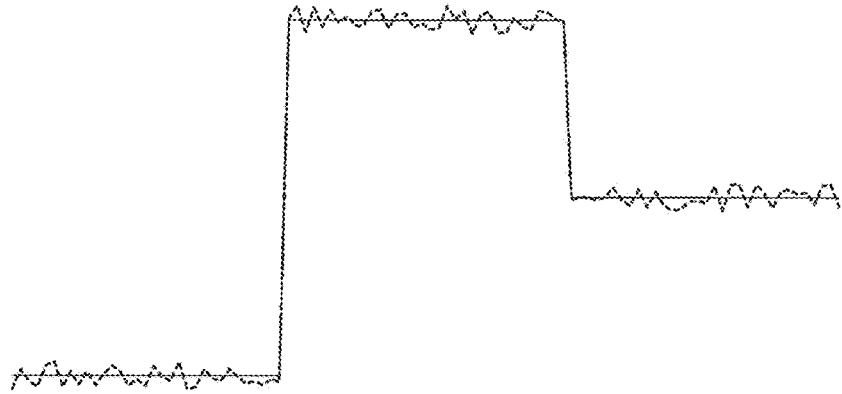
FIG. 10 is a diagram for illustrating random noise.
Figure 11:
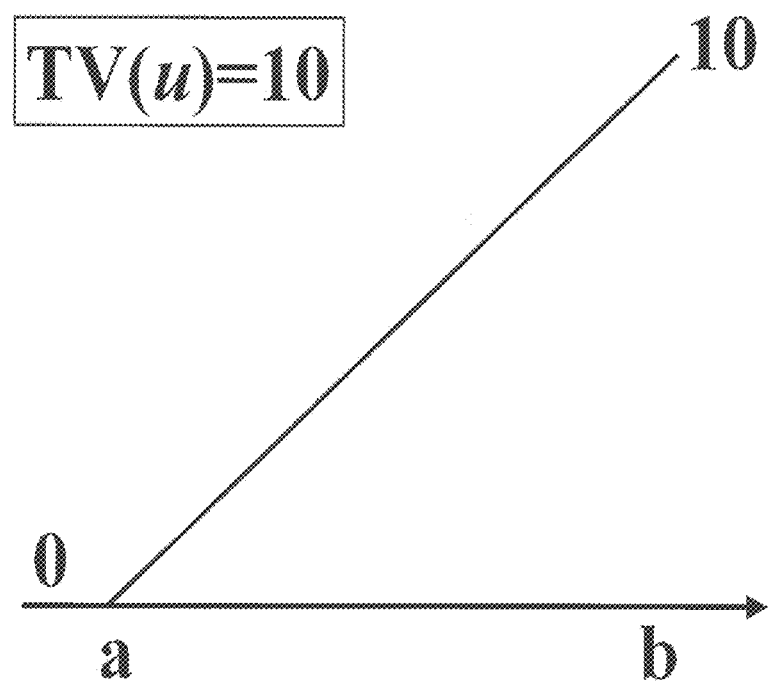
FIG. 11 is a diagram illustrating a TV norm in an area where a signal changes gently.
Figure 12:
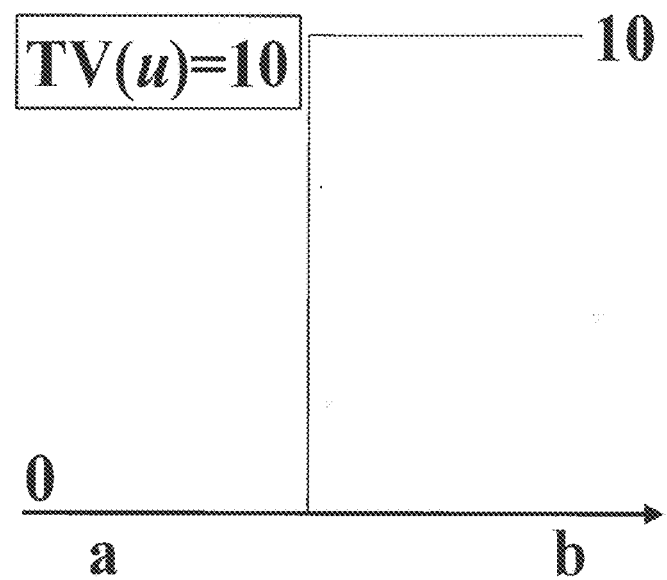
FIG. 12 is a diagram illustrating a TV norm in an area including an edge.
Figure 13:
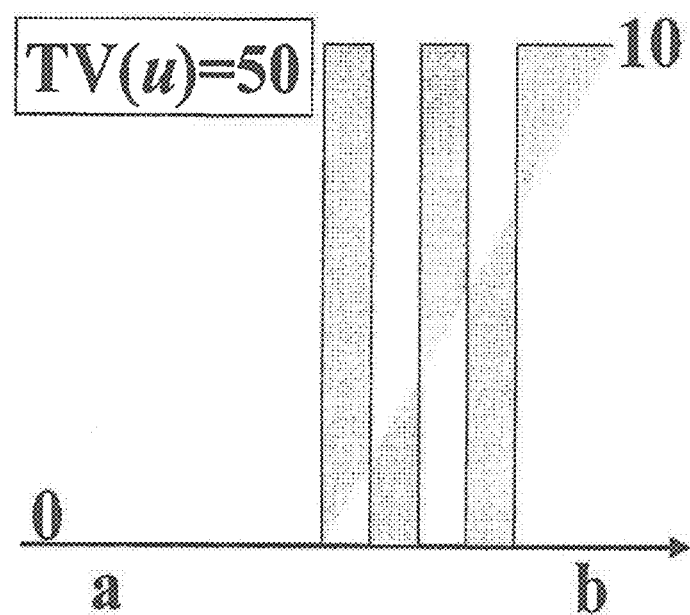
FIG. 13 is a diagram illustrating a TV norm in an area including a vibrating component.
Figure 14:
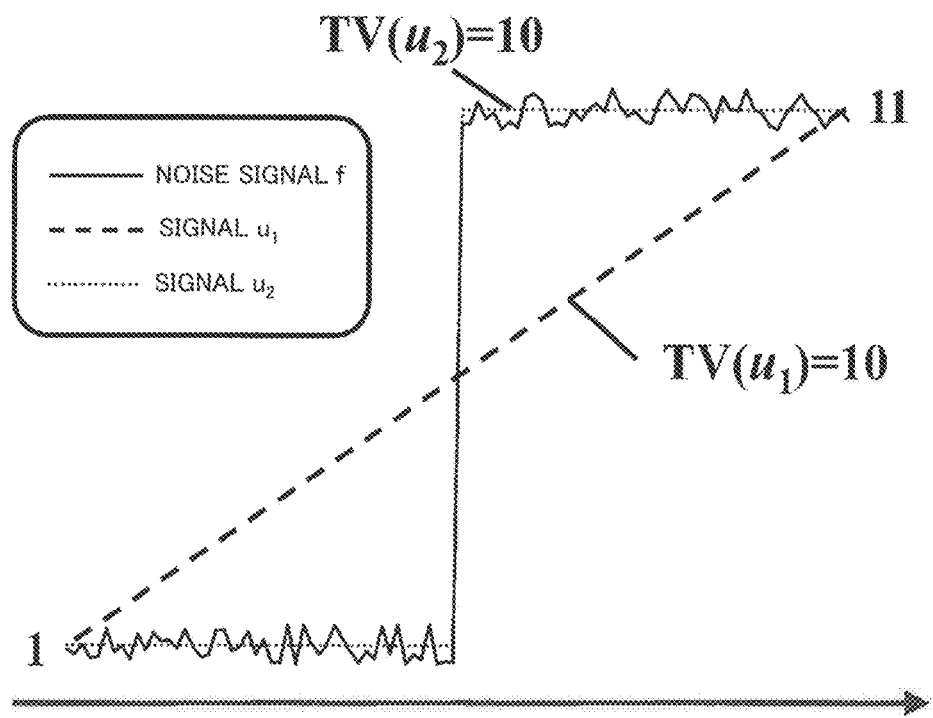
FIG. 14 is a diagram for illustrating a TV method.
Figure 15:
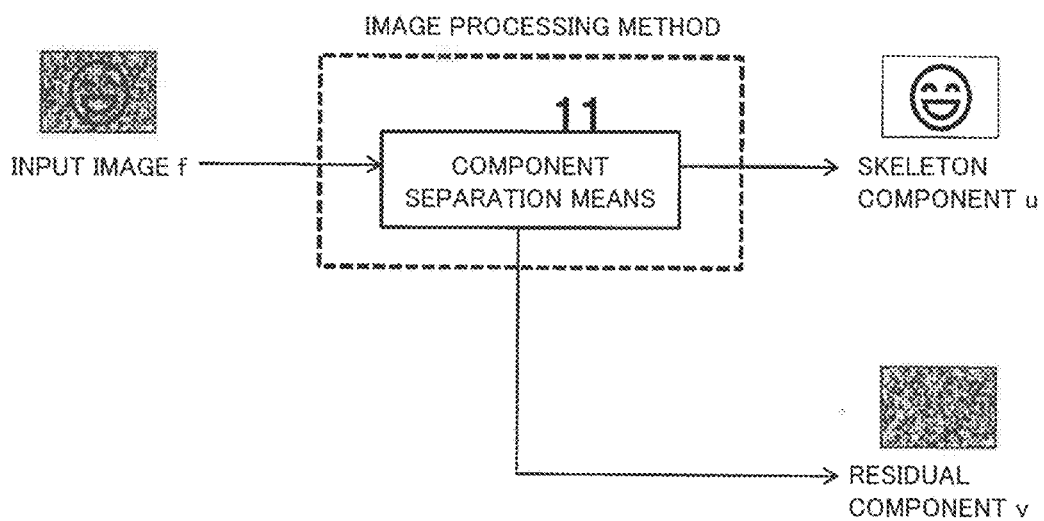
FIG. 15 is a block diagram of a related image processing method.
Figure 16:
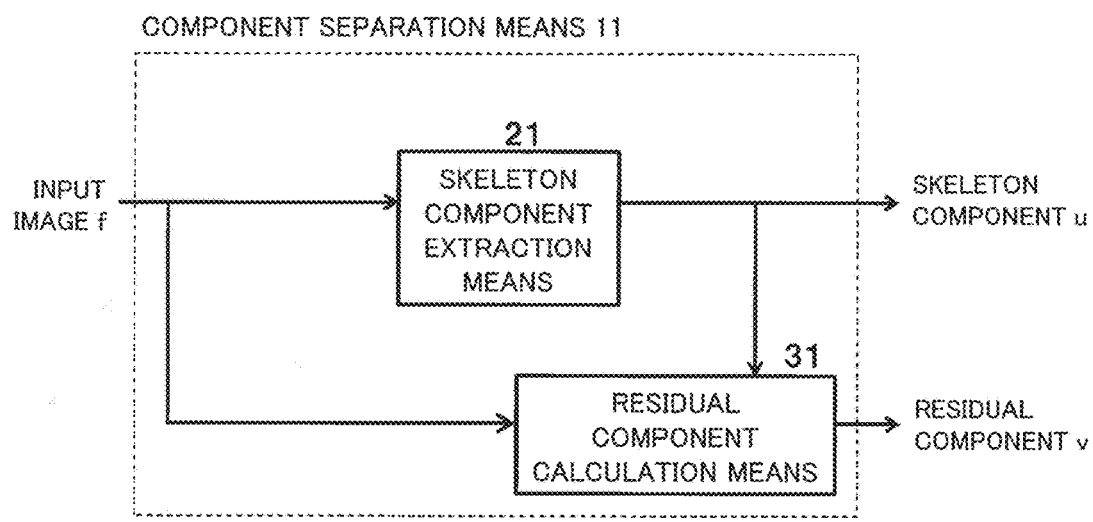
FIG. 16 is a block diagram for illustrating a component separation means 11.
Figure 17:
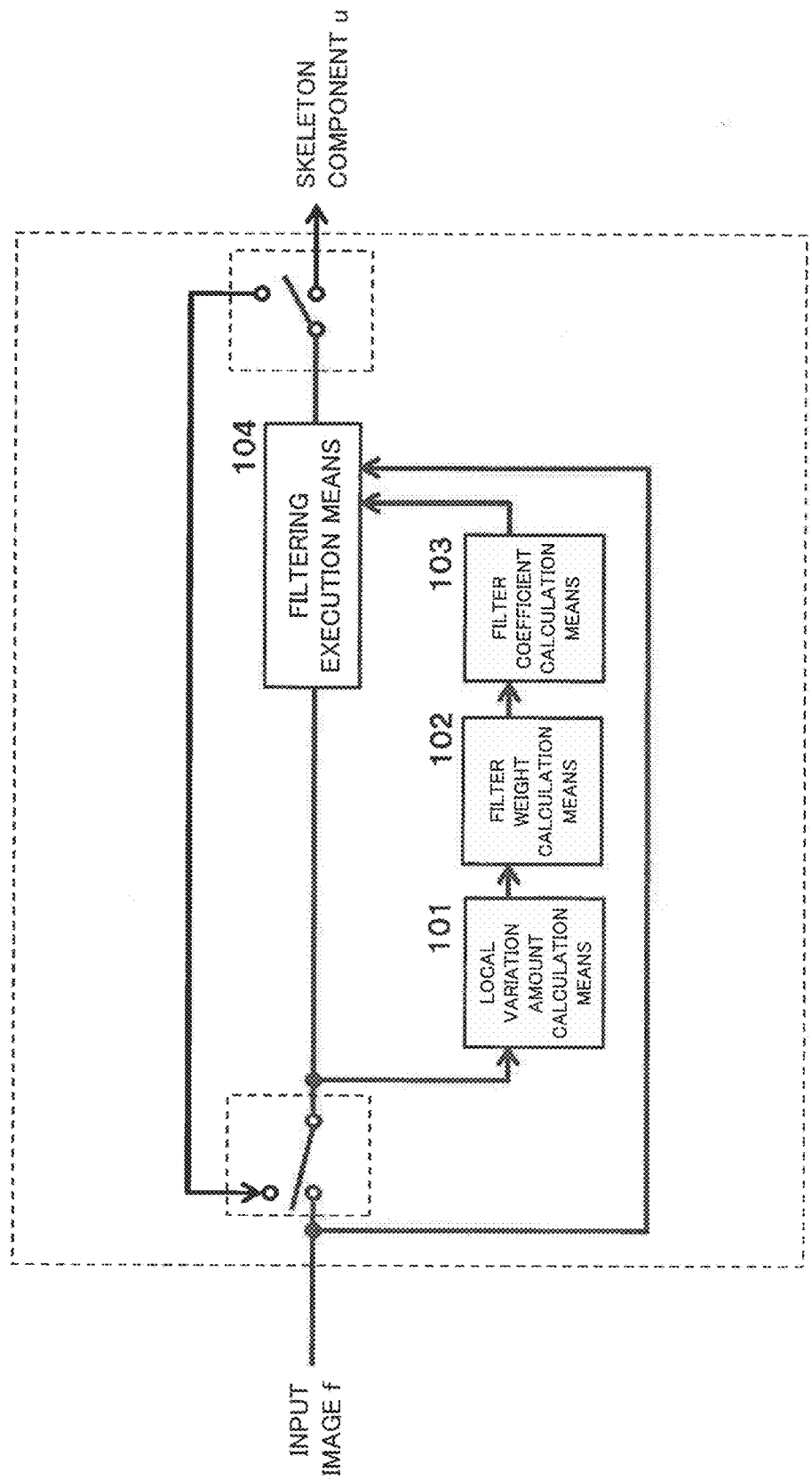
FIG. 17 is a block diagram for illustrating a skeleton component extraction means 21.
Figure 18:
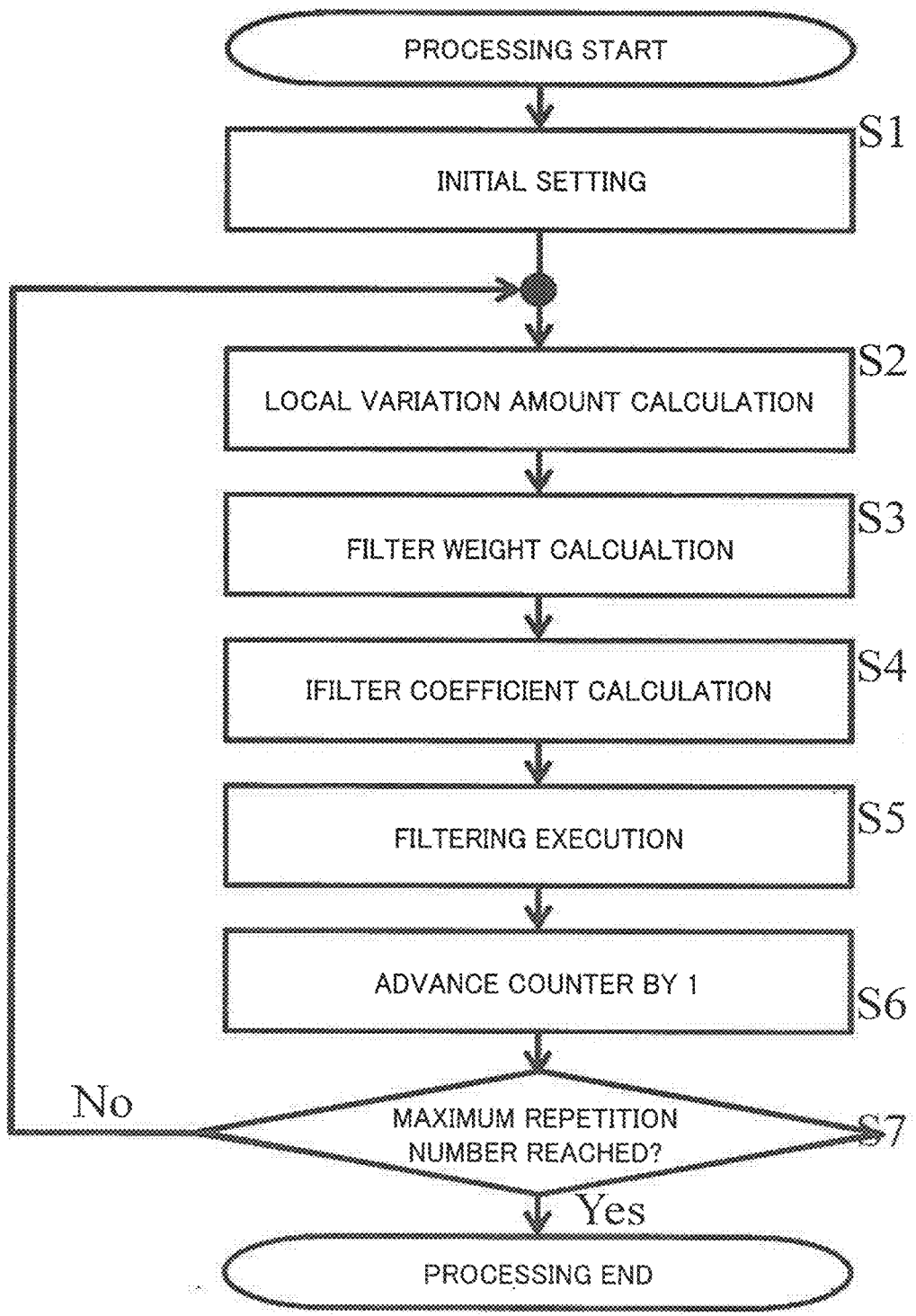
FIG. 18 is a flowchart for illustrating operations of respective processing units of the skeleton component extraction means 21.

FIG. 9 illustrates a block diagram of an image processing device 2000 of the exemplary embodiment of the present invention.

The image processing device 2000 of the exemplary embodiment of the present invention includes the local variation amount calculation unit 1001, the filter weight calculation unit 1002, the filter coefficient calculation unit 1003, the filtering execution unit 1004, the residual component calculation unit 1005, the control unit 1006, the switch 1007, the switch 1008, and the memory 1009 in the same manner as the image processing device 1000, and in addition thereto, newly includes an image feature amount calculation unit 2001 and a filter weight correction unit 2002.

An input image f is input to the switch 1007 and the memory 1009 from an input buffer.

The control unit 1006 operates in the same manner as the image processing device 1000. However, the switch 1007 is controlled so that an image $u^{(k)}$ is newly output to the image feature amount calculation unit 2001, in addition to the local variation amount calculation unit 1001 and the filtering execution unit 1004.

The filter weight calculation unit 1002 receives the local variation amount $|\nabla_\alpha u|$ from the local variation amount calculation unit 1001 and calculates a filter weight $w_{\alpha\beta}(u)$ represented by the above equation (5). The filter weight $w_{\alpha\beta}(u)$ obtained by the calculation is output to the filter weight correction unit 2002.

The image feature amount calculation unit 2001 receives the image $u^{(k)}$ from the switch 1007 and calculates, as an image feature amount, each eigenpair (an eigenvalue and an eigenvector) of the gradient covariance matrix M represented by the above equation (9). The obtained eigenpair is output to the filter weight correction unit 2002 as the image feature amount.

The filter weight correction unit 2002 receives the filter weight $w_{\alpha\beta}(u)$ from the filter weight calculation unit 1002 and the image feature amount from the image feature amount calculation unit 2001, and corrects the filter weight $w_{\alpha\beta}(u)$ as $w'_{\alpha\beta}(u)$ of the above equation (10). The filter weight $w'_{\alpha\beta}(u)$ obtained by the correction is output to the filter coefficient calculation unit 1003.

The filter coefficient calculation unit 1003 receives the filter weight $w'_{\alpha\beta}(u)$ from the filter weight correction unit 2002 and calculates filter coefficients $h_{\alpha\alpha}$ and $h_{\alpha\beta}$ based on the above equations (6) and (7), respectively. The filter coefficients $h_{\alpha\alpha}$ and $h_{\alpha\beta}$ obtained by the calculation are output to the filtering execution unit 1004.

Operations of the local variation amount calculation unit 1001, the filtering execution unit 1004, the residual component calculation unit 1005, the switch 1007, the switch 1008, and the memory 1009 are the same as in the image processing device 1000, and therefore description thereof will be omitted.

As described above, according to the exemplary embodiment of the present invention, lowpass filtering is executed in an optimum filtering direction based on two image feature amounts of a gradient direction and a gradient strength of a pixel value in a surrounding of a target pixel, and therefore noise can be effectively eliminated with preserving an edge in which a variation amount of a pixel value is relatively small.

As is clear also from the above description, the respective units can be configured with hardware but can be realized by a computer program. In this case, a processor operating by a program stored on a program memory realizes the same functions and operations as in the exemplary embodiment. Only a partial function of the above-described exemplary embodiment can be realized by a computer program.

A part or the whole of the exemplary embodiment can be described as in the following supplementary notes but the present invention is not limited thereto.

(Supplementary Note 1)

An image processing method that separates an input image into a skeleton component including an edge component and a flat component and into a residual component expressed by a difference between the input image and the skeleton component, the method including:

calculating a local variation amount that is a variation amount between the target pixel and a pixel adjacent to the target pixel;

calculating a skeleton component extraction filter weight based on the local variation amount;

calculating an image feature amount of a gradient direction of a pixel value in a surrounding of the target pixel and an image feature amount of a gradient strength of the pixel value in the surrounding of the target pixel;

correcting the skeleton component extraction filter weight based on the image feature amount in the gradient direction and the image feature amount of the gradient strength;

calculating a skeleton component extraction filter coefficient based on the corrected skeleton component extraction filter weight; and extracting the skeleton component by applying skeleton component extraction filtering to the target pixel using the skeleton component extraction filter coefficient calculated.

(Supplementary Note 2) The image processing method according to Supplementary Note 1, wherein the skeleton component extraction filter coefficient is a filter coefficient used upon weighting-addition of an initial image and an image obtained by applying predetermined processing to the initial image, and correcting the skeleton component extraction filter weight includes correcting the skeleton component extraction filter weight so that with an increase in the gradient strength, a filter coefficient for the initial image increases.

(Supplementary Note 3) The image processing method according to Supplementary Note 1, wherein the skeleton component extraction filter coefficient is a filter coefficient used upon weighting-addition of an initial image and an image obtained by applying predetermined processing to the initial image, and correcting the skeleton component extraction filter weight includes correcting the skeleton component extraction filter weight so that with a decrease in the gradient strength, a filter coefficient for the initial image decreases.

(Supplementary Note 4) The image processing method according to Supplementary Note 1, wherein the skeleton component extraction filter coefficient is a filter coefficient used upon weighting-addition of an initial image and an image obtained by applying predetermined processing to the initial image, and correcting the skeleton component extraction filter weight includes correcting the skeleton component extraction filter weight so that with an increase in the gradient strength in the gradient direction, a filter coefficient for the initial image increases in the direction.

(Supplementary Note 5) The image processing method according to Supplementary Note 1, wherein the skeleton component extraction filter coefficient is a filter coefficient used upon weighting-addition of an initial image and an image obtained by applying predetermined processing to the initial image, and correcting the skeleton component extraction filter weight includes correcting the skeleton component extraction filter weight so that with a decrease in the gradient strength in the gradient direction, a filter coefficient for the initial image decreases in the direction.

(Supplementary Note 6) The image processing method according to any one of Supplementary Notes 1 to 5, further including setting a correction amount as a predetermined value when a correction amount of the skeleton component extraction filter weight calculated based on the image feature amount in the gradient direction and the image feature amount of the gradient strength is more than or less than a predetermined threshold.

(Supplementary Note 7) The image processing method according to Supplementary Note 6, further including: determining an upper limit value and a lower limit value of a correction amount of the skeleton component extraction filter weight; the correction amount of the skeleton component extraction filter weight being set as the upper limit when the correction amount of the skeleton component extraction filter weight calculated based on the image feature amount in the gradient direction and the image feature amount of the gradient strength is more than a first threshold; and the correction amount of the skeleton component extraction filter weight being set as the lower limit when the correction amount of the skeleton component extraction filter weight calculated based on the image feature amount in the gradient direction and the image feature amount of the gradient strength is less than a second threshold.

(Supplementary Note 8) The image processing method according to any one of Supplementary Notes 1 to 7, further including:

repeating the filtering at a predetermined number of times using the skeleton component as the input image.

(Supplementary Note 9) An image processing device that separates an input image into a skeleton component including an edge component and a flat component and into a residual component expressed by a difference between the input image and the skeleton component, the device including:

a local variation amount calculation unit that calculates a local variation amount that is a variation amount between a target pixel and a pixel adjacent to the target pixel;

a skeleton component extraction filter weight calculation unit that calculates a skeleton component extraction filter weight based on the local variation amount;

an image feature amount calculation unit that calculates an image feature amount of a gradient direction of a pixel value in a surrounding of the target pixel and an image feature amount of a gradient strength of the pixel value in the surrounding of the target pixel;

a skeleton component extraction filter weight correction unit that corrects the skeleton component extraction filter weight based on the image feature amount in the gradient direction and the image feature amount of the gradient strength;

a skeleton component extraction filter coefficient calculation unit that calculates a skeleton component extraction filter coefficient based on the corrected skeleton component extraction filter weight; and a skeleton component extraction filtering execution unit that extracts the skeleton component by applying skeleton component extraction filtering to the target pixel using the skeleton component extraction filter coefficient calculated.

(Supplementary Note 10) The image processing device according to Supplementary Note 9, wherein the skeleton component extraction filter coefficient is a filter coefficient used upon weighting-addition of an initial image and an image obtained by applying predetermined processing to the initial image, and the skeleton component extraction filter weight correction unit corrects the skeleton component extraction filter weight so that with an increase in the gradient strength, a filter coefficient for the initial image increases.

(Supplementary Note 11) The image processing device according to Supplementary Note 9, wherein the skeleton component extraction filter coefficient is a filter coefficient used upon weighting-addition of an initial image and an image obtained by applying predetermined processing to the initial image, and the skeleton component extraction filter weight correction unit corrects the skeleton component extraction filter weight so that with a decrease in the gradient strength, a filter coefficient for the initial image decreases.

(Supplementary Note 12) The image processing device according to Supplementary Note 9, wherein the skeleton component extraction filter coefficient is a filter coefficient used upon weighting-addition of an initial image and an image obtained by applying predetermined processing to the initial image, and the skeleton component extraction filter weight correction unit corrects the skeleton component extraction filter weight so that with an increase in the gradient strength in the gradient direction, a filter coefficient for the initial image increases in the direction.

(Supplementary Note 13) The image processing device according to Supplementary Note 9, wherein the skeleton component extraction filter coefficient is a filter coefficient used upon weighting-addition of an initial image and an image obtained by applying predetermined processing to the initial image, and the skeleton component extraction filter weight correction unit corrects the skeleton component extraction filter weight so that with a decrease in the gradient strength in the gradient direction, a filter coefficient for the initial image decreases in the direction.

(Supplementary Note 14) The image processing device according to any one of Supplementary Notes 9 to 13, wherein the skeleton component extraction filter weight correction unit sets a correction amount as a predetermined value when a correction amount of the skeleton component extraction filter weight calculated based on the image feature amount in the gradient direction and the image feature amount of the gradient strength is more than or less than a predetermined threshold.

(Supplementary Note 15) The image processing device according to Supplementary Note 14, wherein the skeleton component extraction filter weight correction unit stores an upper limit value and a lower limit value of a correction amount of the skeleton component extraction filter weight, sets the correction amount of the skeleton component extraction filter weight as the upper limit when the correction amount of the skeleton component extraction filter weight calculated based on the image feature amount in the gradient direction and the image feature amount of the gradient strength is more than a first threshold, and sets the correction amount of the skeleton component extraction filter weight as the lower limit when the correction amount of the skeleton component extraction filter weight calculated based on the image feature amount in the gradient direction and the image feature amount of the gradient strength is less than a second threshold.

(Supplementary Note 16) The image processing device according to any one of Supplementary Notes 9 to 15, wherein the skeleton component output from the skeleton component extraction filtering execution unit is used as the input image, and the local variation amount calculation unit, the skeleton component extraction filter weight calculation unit, the image feature amount calculation unit, the weight correction unit, the skeleton component extraction filter coefficient calculation unit, and the skeleton component extraction filtering execution unit each repeat the corresponding processing at a predetermined number of times.

(Supplementary Note 17) A program of image processing that separates an input image into a skeleton component including an edge component and a flat component and into a residual component expressed by a difference between the input image and the skeleton component, the program causing a computer to execute:

local variation amount calculation processing for calculating a local variation amount that is a variation amount between the target pixel and a pixel adjacent to the target pixel;

skeleton component extraction filter weight calculation processing for calculating a skeleton component extraction filter weight based on the local variation amount;

image feature amount calculation processing for calculating an image feature amount of a gradient direction of a pixel value in a surrounding of the target pixel and an image feature amount of a gradient strength of the pixel value in the surrounding of the target pixel;

skeleton component extraction filter weight correction processing for correcting the skeleton component extraction filter weight based on the image feature amount in the gradient direction and the image feature amount of the gradient strength;

skeleton component extraction filter coefficient calculation processing for calculating a skeleton component extraction filter coefficient based on the corrected skeleton component extraction filter weight; and skeleton component extraction filtering execution processing for extracting the skeleton component by applying skeleton component extraction filtering to the target pixel using the calculated skeleton component extraction filter coefficient.

(Supplementary Note 18) The program according to Supplementary Note 17, wherein the skeleton component extraction filter coefficient is a filter coefficient used upon weighting-addition of an initial image and an image obtained by applying predetermined processing to the initial image, and the skeleton component extraction filter weight correction processing corrects the skeleton component extraction filter weight so that with an increase in the gradient strength, a filter coefficient for the initial image increases.

(Supplementary Note 19) The program according to Supplementary Note 17, wherein the skeleton component extraction filter coefficient is a filter coefficient used upon weighting-addition of an initial image and an image obtained by applying predetermined processing to the initial image, and the skeleton component extraction filter weight correction processing corrects the skeleton component extraction filter weight so that with a decrease in the gradient strength, a filter coefficient for the initial image decreases.

(Supplementary Note 20) The program according to Supplementary Note 17, wherein the skeleton component extraction filter coefficient is a filter coefficient used upon weighting-addition of an initial image and an image obtained by applying predetermined processing to the initial image, and the skeleton component extraction filter weight correction processing corrects the skeleton component extraction filter weight so that with an increase in the gradient strength in the gradient direction, a filter coefficient for the initial image increases in the direction.

(Supplementary Note 21) The program according to Supplementary Note 17, wherein the skeleton component extraction filter coefficient is a filter coefficient used upon weighting-addition of an initial image and an image obtained by applying predetermined processing to the initial image, and the skeleton component extraction filter weight correction processing corrects the skeleton component extraction filter weight so that with a decrease in the gradient strength in the gradient direction, a filter coefficient for the initial image decreases in the direction.

(Supplementary Note 22) The program according to any one of Supplementary Notes 17 to 21, wherein the skeleton component extraction filter weight correction processing sets a correction amount as a predetermined value when a correction amount of the skeleton component extraction filter weight calculated based on the image feature amount in the gradient direction and the image feature amount of the gradient strength is more than or less than a predetermined threshold.

(Supplementary Note 23) The program according to Supplementary Note 22, wherein the skeleton component extraction filter weight correction processing stores an upper limit and a lower limit of a correction amount of the skeleton component extraction filter weight, sets the correction amount of the skeleton component extraction filter weight as the upper limit when the correction amount of the skeleton component extraction filter weight calculated based on the image feature amount in the gradient direction and the image feature amount of the gradient strength is more than a first threshold, and sets the correction amount of the skeleton component extraction filter weight as the lower limit when the correction amount of the skeleton component extraction filter weight calculated based on the image feature amount in the gradient direction and the image feature amount of the gradient strength is less than a second threshold.

(Supplementary Note 24) The program according to any one of Supplementary Notes 17 to 23, using the skeleton component output by the skeleton component extraction filtering execution processing as the input image, and repeating the local variation amount calculation processing, the skeleton component extraction filter weight calculation processing, the image feature amount calculation processing, the weight correction processing, the skeleton component extraction filter coefficient calculation processing, and the skeleton component extraction filtering execution processing at a predetermined number of times.

The present invention has been described with reference to the preferred exemplary embodiment, but the present invention is not necessarily limited thereto and therefore can be subjected to various modifications and carried out within the scope of its technical idea.

This application is based upon and claims the benefit of priority from Japanese patent application No. 2013-28876, filed on Feb. 18, 2013, the disclosure of which is incorporated herein in its entirety by reference.

REFERENCE SIGNS LIST 1 image processing method
2 image processing method
11 component separation means
21 skeleton component extraction means
22 skeleton component extraction means
31 residual component calculation means
101 local variation amount calculation means
102 filter weight calculation means
103 filter coefficient calculation means
104 filtering execution means
201 image feature amount calculation unit
202 filter weight correction unit
1000 image processing device
1001 local variation amount calculation unit
1002 filter weight calculation unit
1003 filter coefficient calculation unit
1004 filtering execution unit
1005 residual component calculation unit
1006 control unit
1007 switch
1008 switch
1009 memory
2000 image processing device
2001 image feature amount calculation unit
2002 filter weight correction unit

The invention claimed is:

1. An image processing device that separates an input image into a skeleton component including an edge component and a flat component and into a residual component expressed by a difference between the input image and the skeleton component, the device comprising:
   at least one non-transitory memory operable to store program code; and
   at least one processor operable to read said program code and configured to operate as instructed by said program code, said program code including:
   a local variation amount calculation code configured to cause the at least one processor to calculate a local variation amount that is a variation amount between a target pixel and a pixel adjacent to the target pixel;
   a skeleton component extraction filter weight calculation code configured to cause the at least one processor to calculate a filter weight for extracting the skeleton component based on the local variation amount;
   an image feature amount calculation code configured to cause the at least one processor to calculate an image feature amount of a gradient direction of a pixel value in a surrounding of the target pixel and an image feature amount of a gradient strength of the pixel value in the surrounding of the target pixel;
   a skeleton component extraction filter weight correction code configured to cause the at least one processor to correct the filter weight based on the image feature amount in the gradient direction and the image feature amount of the gradient strength;
   a skeleton component extraction filter coefficient calculation code configured to cause the at least one processor to calculate a filter coefficient based on the corrected filter weight; and
   a skeleton component extraction filtering execution code configured to cause the at least one processor to extract the skeleton component by applying skeleton component extraction filtering to the target pixel using the filter coefficient.

2. The image processing device according to claim 1, wherein
   the filter coefficient is a filter coefficient used upon weighting-addition of an initial image and an image obtained by applying predetermined processing to the initial image, and
   the skeleton component extraction filter weight correction code is further configured to cause the at least one processor to correct the filter weight so that with an increase in the gradient strength, the filter coefficient for the initial image increases.

3. The image processing device according to claim 1, wherein
   the filter coefficient is a filter coefficient used upon weighting-addition of an initial image and an image obtained by applying predetermined processing to the initial image, and
   the skeleton component extraction filter weight correction code is further configured to cause the at least one processor to correct the filter weight so that with a decrease in the gradient strength, the filter coefficient for the initial image decreases.

4. The image processing device according to claim 1, wherein
the filter coefficient is a filter coefficient used upon weighting-addition of an initial image and an image obtained by applying predetermined processing to the initial image, and
the skeleton component extraction filter weight correction code is further configured to cause the at least one processor to correct the filter weight so that with an increase in the gradient strength in the gradient direction, the filter coefficient for the initial image increases in the direction.

5. The image processing device according to claim 1, wherein
the filter coefficient is a filter coefficient used upon weighting-addition of an initial image and an image obtained by applying predetermined processing to the initial image, and
the skeleton component extraction filter weight correction code is further configured to cause the at least one processor to correct the filter weight so that with a decrease in the gradient strength in the gradient direction, the filter coefficient for the initial image decreases in the direction.

6. The image processing device according to claim 1, wherein
the skeleton component extraction filter weight correction code is further configured to cause the at least one processor to set a correction amount as a predetermined value when a correction amount of the filter weight calculated based on the image feature amount in the gradient direction and the image feature amount of the gradient strength is more than or less than a predetermined threshold.

7. The image processing device according to claim 6, wherein
the skeleton component extraction filter weight correction code is further configured to cause the at least one processor to store an upper limit value and a lower limit value of a correction amount of the filter weight, set the correction amount of the filter weight as the upper limit when the correction amount of the filter weight calculated based on the image feature amount in the gradient direction and the image feature amount of the gradient strength is more than a first threshold, and set the correction amount of the filter weight as the lower limit when the correction amount of the filter weight calculated based on the image feature amount in the gradient direction and the image feature amount of the gradient strength is less than a second threshold.

8. The image processing device according to claim 1, wherein
the skeleton component output from the skeleton component extraction filtering execution unit is used as the input image, and
each of the local variation amount calculation code, the skeleton component extraction filter weight calculation code, the image feature amount calculation code, the weight correction code, the skeleton component extraction filter coefficient calculation code, and the skeleton component extraction filtering execution code is further configured to cause the at least one processor to repeat the corresponding processing at a predetermined number of times.

* * * * *